United States Patent
Seo et al.

(10) Patent No.: US 9,722,754 B2
(45) Date of Patent: Aug. 1, 2017

(54) METHOD FOR MAKING A TERMINAL SEND AN UPLINK ACK/NACK SIGNAL IN A WIRELESS COMMUNICATION SYSTEM USING CARRIER AGGREGATION TECHNIQUES AND APPARATUS FOR THE SAME

(71) Applicant: LG ELECTRONICS INC., Seoul (KR)

(72) Inventors: Hanbyul Seo, Anyang-si (KR); Suckchel Yang, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/426,127

(22) PCT Filed: Sep. 2, 2013

(86) PCT No.: PCT/KR2013/007895
§ 371 (c)(1),
(2) Date: Mar. 4, 2015

(87) PCT Pub. No.: WO2014/038821
PCT Pub. Date: Mar. 13, 2014

(65) Prior Publication Data
US 2015/0236834 A1 Aug. 20, 2015

Related U.S. Application Data

(60) Provisional application No. 61/697,787, filed on Sep. 6, 2012.

(51) Int. Cl.
*H04L 5/00* (2006.01)
*H04W 72/04* (2009.01)

(52) U.S. Cl.
CPC ......... *H04L 5/0055* (2013.01); *H04W 72/042* (2013.01); *H04W 72/0413* (2013.01); *H04W 72/0453* (2013.01)

(58) Field of Classification Search
CPC ........... H04W 72/042; H04W 72/0413; H04W 72/0453; H04L 5/0055
See application file for complete search history.

(56) References Cited

U.S. PATENT DOCUMENTS

2012/0207109 A1* 8/2012 Pajukoski ............. H04L 1/0029
370/329
2013/0083742 A1* 4/2013 Baldemair .............. H04L 1/003
370/329

(Continued)

FOREIGN PATENT DOCUMENTS

| CN | 102365837 A | 2/2012 |
|---|---|---|
| CN | 102656831 A | 9/2012 |

(Continued)

OTHER PUBLICATIONS

LG Electronics, "Resource Allocation for TDD PUCCH format 3", R1-110841, 3GPP TSG RAN WG1 Meeting #64, Taipei, Taiwan, Feb. 21-25, 2011 (see pp. 1-5).

(Continued)

*Primary Examiner* — Albert T Chou
(74) *Attorney, Agent, or Firm* — Dentons US LLP

(57) ABSTRACT

The present application discloses a method for making a terminal send an uplink ACK (acknowledgement)/NACK (negative ACK) signal in a wireless communications system. Specifically, the method includes the steps of: receiving at least one downlink data signal from a network through at least one of a first and second cells; generating an ACK/NACK signal corresponding to the at least one downlink data signal; and sending the ACK/NACK signal through one of the first and the second cells, wherein the structure of the ACK/NACK signal is determined based on the number of the downlink data signals, and if the number of the downlink data signals is plural, the structure of the ACK/NACK signal is first type, and if receiving one downlink data signal (Continued)

through the first cell only or the second cell only, the structure of the ACK/NACK signal is second type.

10 Claims, 14 Drawing Sheets

(56) References Cited

U.S. PATENT DOCUMENTS

| | | | | |
|---|---|---|---|---|
| 2013/0301571 A1* | 11/2013 | Sorrentino | ............. | H04L 5/001 370/329 |
| 2014/0036810 A1* | 2/2014 | Harrison | ............. | H04W 72/042 370/329 |
| 2015/0327230 A1* | 11/2015 | Takeda | ............. | H04L 5/001 370/329 |

FOREIGN PATENT DOCUMENTS

| | | |
|---|---|---|
| KR | 10-2012-0084229 A | 7/2012 |
| WO | 2010-018826 A1 | 2/2010 |

OTHER PUBLICATIONS

3GPP TS 36.213 V10.6.0, "3GPP; TSGRAN; Evolved Universal Terrestrial Radio Access (E-UTRA); Physical layer procedures (Release 10)", Jun. 2012 (see pp. 104-117).

* cited by examiner

FIG. 2
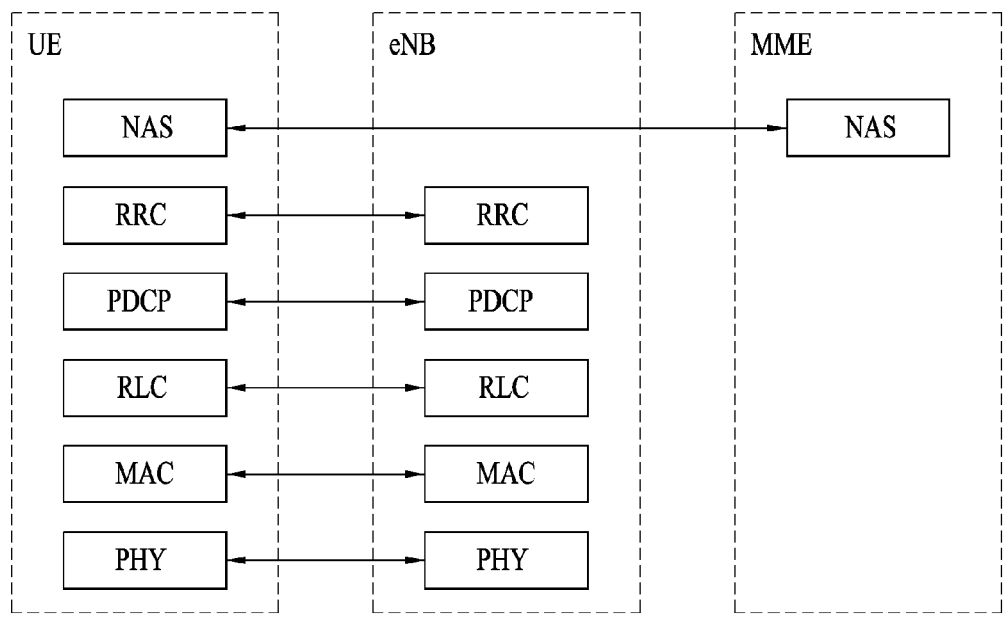
(a) control plane protocol stack
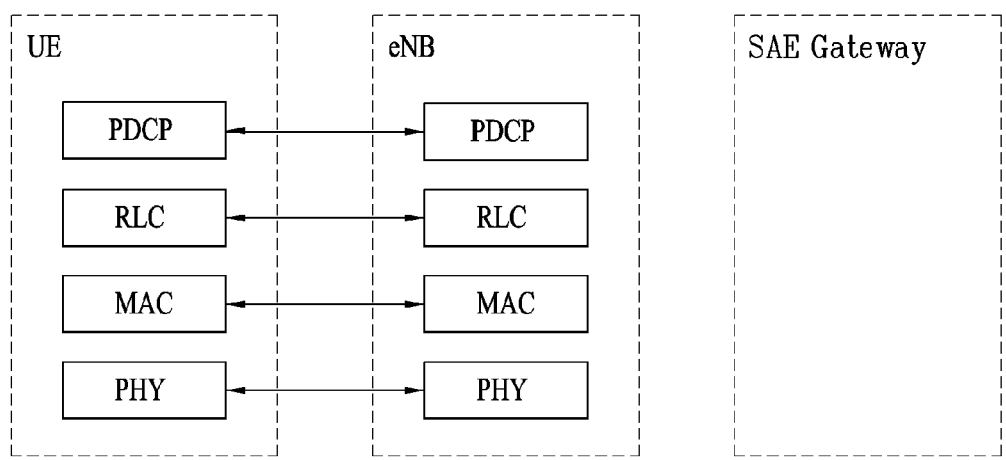
(b) user plane protocol stack PUCCH format 1a and 1b structure (normal CP case)

PUCCH format 1a and 1b structure (extended CP case)

PUCCH format 2, 2a and 2b structure (normal CP case)

PUCCH format 2, 2a and 2b structure (extended CP case)

METHOD FOR MAKING A TERMINAL SEND AN UPLINK ACK/NACK SIGNAL IN A WIRELESS COMMUNICATION SYSTEM USING CARRIER AGGREGATION TECHNIQUES AND APPARATUS FOR THE SAME

This application is a 35 U.S.C. §371 National Stage Entry of International Application No. PCT/KR2013/007895 filed Sep. 2, 2013, which claims benefit of and priority to U.S. Provisional Application No. 61/697,787 filed Sep. 6, 2012, both of which are incorporated by reference for all purposes as if fully set forth herein.

TECHNICAL FIELD

The present invention relates to a wireless communication system, and more particularly, to a method of transmitting an uplink ACK/NACK signal, which is transmitted by a user equipment in a wireless communication system to which a carrier aggregation technique is applied, and an apparatus therefor.

BACKGROUND ART

3GPP LTE (3rd generation partnership project long term evolution hereinafter abbreviated LTE) communication system is schematically explained as an example of a wireless communication system to which the present invention is applicable.

FIG. 1 is a schematic diagram of E-UMTS network structure as one example of a wireless communication system. E-UMTS (evolved universal mobile telecommunications system) is a system evolved from a conventional UMTS (universal mobile telecommunications system). Currently, basic standardization works for the E-UMTS are in progress by 3GPP. E-UMTS is called LTE system in general. Detailed contents for the technical specifications of UMTS and E-UMTS refers to release 7 and release 8 of "3rd generation partnership project; technical specification group radio access network", respectively.

Referring to FIG. 1, E-UMTS includes a user equipment (UE), an eNode B (eNB), and an access gateway (hereinafter abbreviated AG) connected to an external network in a manner of being situated at the end of a network (E-UTRAN). The eNode B may be able to simultaneously transmit multi data streams for a broadcast service, a multicast service and/or a unicast service.

One eNode B contains at least one cell. The cell provides a downlink transmission service or an uplink transmission service to a plurality of user equipments by being set to one of 1.25 MHz, 2.5 MHz, 5 MHz, 10 MHz, 15 MHz, and 20 MHz of bandwidths. Different cells can be configured to provide corresponding bandwidths, respectively. An eNode B controls data transmissions/receptions to/from a plurality of the user equipments. For a downlink (hereinafter abbreviated DL) data, the eNode B informs a corresponding user equipment of time/frequency region on which data is transmitted, coding, data size, HARQ (hybrid automatic repeat and request) related information and the like by transmitting DL scheduling information. And, for an uplink (hereinafter abbreviated UL) data, the eNode B informs a corresponding user equipment of time/frequency region usable by the corresponding user equipment, coding, data size, HARQ-related information and the like by transmitting UL scheduling information to the corresponding user equipment. Interfaces for user-traffic transmission or control traffic transmission may be used between eNode Bs. A core network (CN) consists of an AG (access gateway) and a network node for user registration of a user equipment and the like. The AG manages a mobility of the user equipment by a unit of TA (tracking area) consisting of a plurality of cells.

Wireless communication technologies have been developed up to LTE based on WCDMA. Yet, the ongoing demands and expectations of users and service providers are consistently increasing. Moreover, since different kinds of radio access technologies are continuously developed, a new technological evolution is required to have a future competitiveness. Cost reduction per bit, service availability increase, flexible frequency band use, simple structure/open interface and reasonable power consumption of user equipment and the like are required for the future competitiveness.

DISCLOSURE OF THE INVENTION

Technical Task

A technical task of the present invention is to propose a method of transmitting an uplink ACK/NACK signal, which is transmitted by a user equipment in a wireless communication system to which a carrier aggregation technique is applied, and an apparatus therefor based on the discussion described in the foregoing description.

Technical Solution

To achieve these and other advantages and in accordance with the purpose of the present invention, as embodied and broadly described, according to one embodiment, a method of transmitting an uplink ACK (acknowledgement)/NACK (negative ACK) signal, which is transmitted by a user equipment in a wireless communication system, includes the steps of receiving one or more downlink data signals from a network via at least one of a first cell and a second cell, generating an ACK/NACK signal corresponding to the one or more downlink data signals and transmitting the ACK/NACK signal to the network via one of the first cell and the second cell. A structure of the ACK/NACK signal is determined based on the number of the downlink data signal, if the number of the downlink data signal corresponds to a plural number, the structure of the ACK/NACK signal corresponds to a first type and if a single downlink data signal is received via the first cell only or if the single downlink data signal is received via the second cell only, the structure of the ACK/NACK signal corresponds to a second type.

To further achieve these and other advantages and in accordance with the purpose of the present invention, according to a different embodiment, a user equipment in a wireless communication system includes a reception module configured to receive one or more downlink data signals from a network via at least one of a first cell and a second cell, a processor configured to determine a structure of an ACK (acknowledgement)/NACK (negative ACK) signal based on the number of the one or more downlink data signals and generate the ACK/NACK signal corresponding to the one or more downlink data signals and a transmission module configured to transmit the ACK/NACK signal to the network via one of the first cell and the second cell. If the number of the downlink data signal corresponds to a plural number, the structure of the ACK/NACK signal corresponds to a first type and if a single downlink data signal is received via the first cell only or if the single downlink data signal is received via the second cell only, the structure of the ACK/NACK signal corresponds to a second type.

In this case, scheduling information on the one or more downlink data signals can be received via the first cell. Preferably, a resource used for transmitting the ACK/NACK signal is determined based on a resource receiving scheduling information on the one or more downlink data signals. Additionally, the method can receive information on a cell used for transmitting the ACK/NACK signal.

More preferably, the structure of the ACK/NACK signal of the first type corresponds to response information on each of a plurality of the downlink data signals adjacent each other and the structure of the ACK/NACK signal of the second type includes response information on a single downlink data signal only.

Moreover, the first cell corresponds to a frequency band of a macro eNB and the second cell may correspond to a frequency band of a micro eNB located within coverage of the macro eNB.

In particular, if a single downlink data signal is received via the second cell only, scheduling information on the single downlink data signal can include information on a transmit power control command of the ACK/NACK signal.

Advantageous Effects

According to one embodiment of the present invention, a user equipment can efficiently transmit an uplink ACK/NACK signal in a wireless communication system to which a carrier aggregation technique is applied.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

FIGS. 2(*a*) and (*b*) are diagrams for structures of control and user planes of radio interface protocol between a 3GPP radio access network standard-based user equipment and E-UTRAN;

BEST MODE

Mode for Invention

Figure 1:
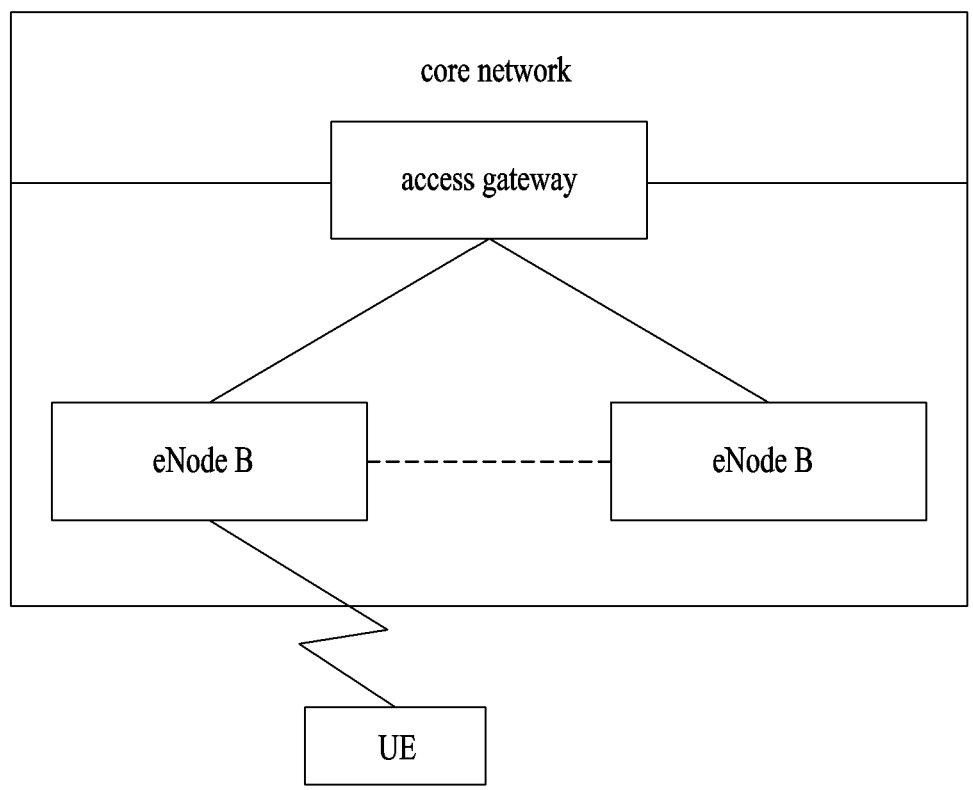
FIG. 1 is a schematic diagram of E-UMTS network structure as one example of a wireless communication system.

In the following description, compositions of the present invention, effects and other characteristics of the present invention can be easily understood by the embodiments of the present invention explained with reference to the accompanying drawings. Embodiments explained in the following description are examples of the technological features of the present invention applied to 3GPP system.

In this specification, the embodiments of the present invention are explained using an LTE system and an LTE-A system, which is exemplary only. The embodiments of the present invention are applicable to various communication systems corresponding to the above mentioned definition.

FIG. 2 is a diagram for structures of control and user planes of radio interface protocol between a 3GPP radio access network standard-based user equipment and E-UTRAN. The control plane means a path on which control messages used by a user equipment (UE) and a network to manage a call are transmitted. The user plane means a path on which such a data generated in an application layer as audio data, internet packet data, and the like are transmitted.

A physical layer, which is a 1st layer, provides higher layers with an information transfer service using a physical channel. The physical layer is connected to a medium access control layer situated above via a transport channel. Data moves between the medium access control layer and the physical layer on the transport channel. Data moves between a physical layer of a transmitting side and a physical layer of a receiving side on the physical channel. The physical channel utilizes time and frequency as radio resources. Specifically, the physical layer is modulated by OFDMA (orthogonal frequency division multiple access) scheme in DL and the physical layer is modulated by SC-FDMA (single carrier frequency division multiple access) scheme in UL.

Medium access control (hereinafter abbreviated MAC) layer of a 2nd layer provides a service to a radio link control (hereinafter abbreviated RLC) layer, which is a higher layer, on a logical channel. The RLC layer of the 2nd layer supports a reliable data transmission. The function of the RLC layer may be implemented by a function block within the MAC. PDCP (packet data convergence protocol) layer of the 2nd layer performs a header compression function to reduce unnecessary control information, thereby efficiently transmitting such IP packets as IPv4 packets and IPv6 packets in a narrow band of a radio interface.

Radio resource control (hereinafter abbreviated RRC) layer situated in the lowest location of a 3rd layer is defined on a control plane only. The RRC layer is responsible for control of logical channels, transport channels and physical channels in association with a configuration, a re-configuration and a release of radio bearers (hereinafter abbreviated RBs). The RB indicates a service provided by the 2nd layer for a data delivery between the user equipment and the network. To this end, the RRC layer of the user equipment and the RRC layer of the network exchange a RRC message with each other. In case that there is an RRC connection (RRC connected) between the user equipment and the RRC layer of the network, the user equipment lies in the state of RRC connected (connected mode). Otherwise, the user equipment lies in the state of RRC idle (idle mode). A non-access stratum (NAS) layer situated at the top of the RRC layer performs such a function as a session management, a mobility management and the like.

A single cell consisting of an eNode B is set to one of 1.25 MHz, 2.5 MHz, 5 MHz, 10 MHz, 15 MHz, and 20 MHz of bandwidths and then provides a downlink or uplink transmission service to a plurality of user equipments. Different cells can be configured to provide corresponding bandwidths, respectively.

DL transport channels for transmitting data from a network to a user equipment include a BCH (broadcast channel) for transmitting a system information, a PCH (paging channel) for transmitting a paging message, a downlink SCH (shared channel) for transmitting a user traffic or a control message and the like. DL multicast/broadcast service traffic or a control message may be transmitted on the DL SCH or a separate DL MCH (multicast channel). Meanwhile, UL transport channels for transmitting data from a user equipment to a network include a RACH (random access channel) for transmitting an initial control message, an uplink SCH (shared channel) for transmitting a user traffic or a control message. A logical channel, which is situated above a transport channel and mapped to the transport channel, includes a BCCH (broadcast channel), a PCCH (paging control channel), a CCCH (common control channel), a MCCH (multicast control channel), a MTCH (multicast traffic channel) and the like.

Figure 3:
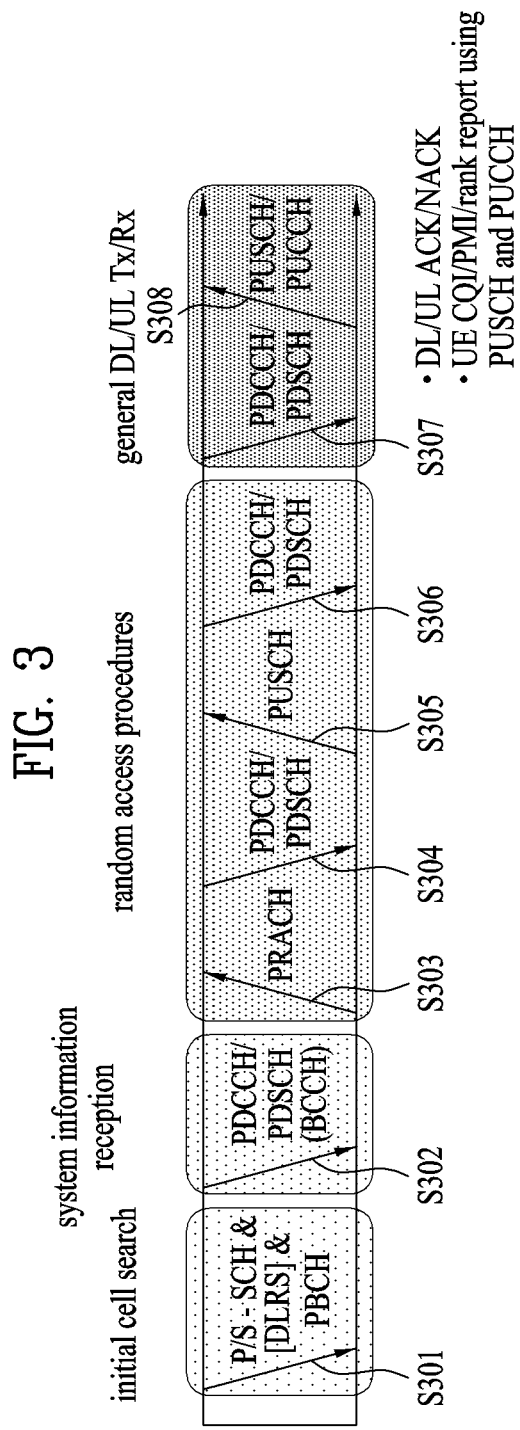
FIG. 3 is a diagram for explaining physical channels used for 3GPP system and a general signal transmission method using the physical channels.

FIG. 3 is a diagram for explaining physical channels used for 3GPP system and a general signal transmission method using the physical channels.

If a power of a user equipment is turned on or the user equipment enters a new cell, the user equipment may perform an initial cell search job for matching synchronization with an eNode B and the like [S301]. To this end, the user equipment may receive a primary synchronization channel (P-SCH) and a secondary synchronization channel (S-SCH) from the eNode B, may be synchronized with the eNode B and may be then able to obtain information such as a cell ID and the like. Subsequently, the user equipment receives a physical broadcast channel from the eNode B and may be then able to obtain intra-cell broadcast information. Meanwhile, the user equipment receives a downlink reference signal (DL RS) in the initial cell search step and may be then able to check a DL channel state.

Having completed the initial cell search, the user equipment may receive a physical downlink shared control channel (PDSCH) according to a physical downlink control channel (PDCCH) and an information carried on the physical downlink control channel (PDCCH). The user equipment may be then able to obtain detailed system information [S302].

Meanwhile, if a user equipment initially accesses an eNode B or does not have a radio resource for transmitting a signal, the user equipment may be able to perform a random access procedure (RACH) to complete the access to the eNode B [S303 to S306]. To this end, the user equipment may transmit a specific sequence as a preamble on a physical random access channel (PRACH) [S303] and may be then able to receive a response message on PDCCH and the corresponding PDSCH in response to the preamble [S304]. In case of a contention based random access procedure (RACH), it may be able to additionally perform a contention resolution procedure.

Having performed the above mentioned procedures, the user equipment may be able to perform a PDCCH/PDSCH reception [S307] and a PUSCH/PUCCH (physical uplink shared channel/physical uplink control channel) transmission [S308] as a general uplink/downlink signal transmission procedure. In particular, the user equipment receives a DCI (downlink control information) on the PDCCH. In this case, the DCI includes such a control information as an information on resource allocation to the user equipment. The format of the DCI varies in accordance with its purpose.

Meanwhile, control information transmitted to an eNode B from a user equipment via UL or the control information received by the user equipment from the eNode B includes downlink/uplink ACK/NACK signals, CQI (Channel Quality Indicator), PMI (Precoding Matrix Index), RI (Rank Indicator) and the like. In case of 3GPP LTE system, the user equipment may be able to transmit the aforementioned control information such as CQI/PMI/RI and the like on PUSCH and/or PUCCH.

Figure 4:
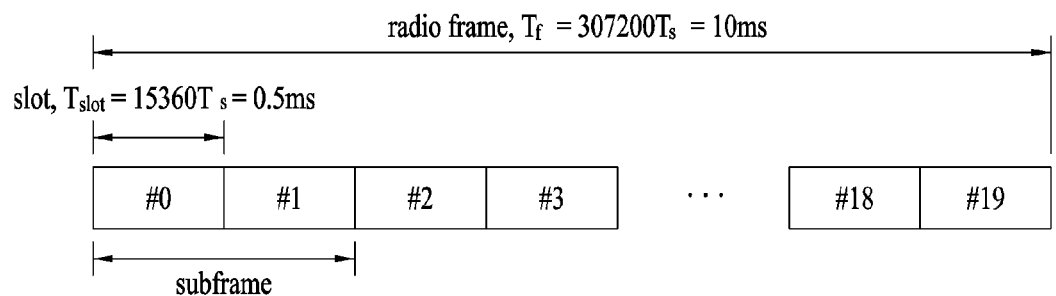
FIG. 4 is a diagram for a structure of a radio frame in LTE system.

FIG. 4 is a diagram for a structure of a radio frame used in an LTE system.

Referring to FIG. 4, one radio frame has a length of 10 ms (327,200×TS) and is constructed with 10 subframes in equal size. Each of the subframes has a length of 1 ms and is constructed with two slots. Each of the slots has a length of 0.5 ms (15,360×TS). In this case, Ts indicates a sampling time and is represented as Ts=1/(15 kHz×2048)=3.2552× 10-8 (i.e., about 33 ns). The slot includes a plurality of OFDM symbols in a time domain and also includes a plurality of resource blocks (RBs) in a frequency domain. In the LTE system, one resource block includes '12 subcarriers×7 or 6 OFDM symbols'. A transmission time interval (TTI), which is a unit time for transmitting data, can be determined by at least one subframe unit. The aforementioned structure of a radio frame is just exemplary. And, the number of subframes included in a radio frame, the number of slots included in a subframe and the number of OFDM symbols included in a slot may be modified in various ways.

Figure 5:
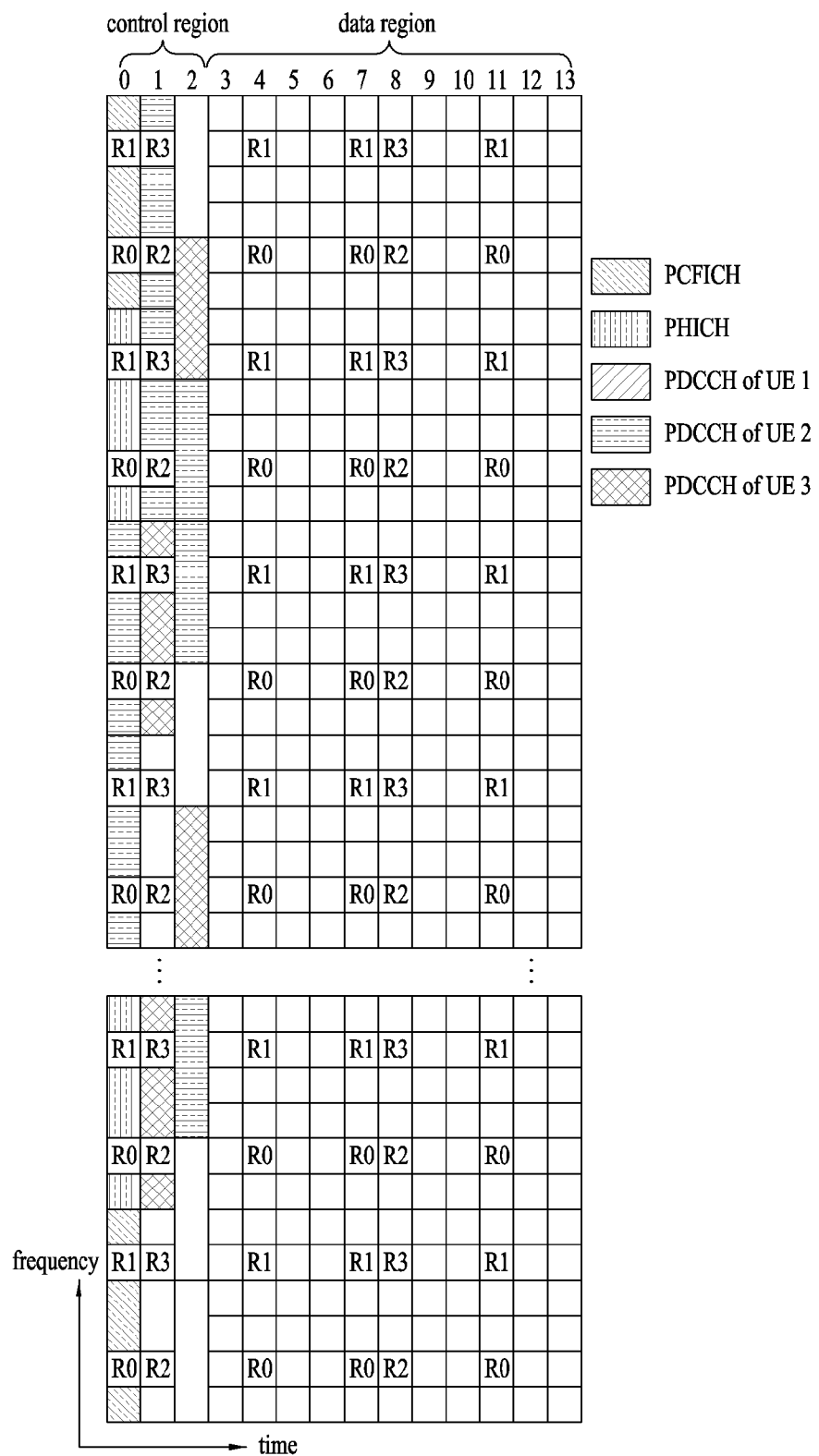
FIG. 5 is a diagram for a structure of a downlink radio frame in LTE system.

FIG. 5 is a diagram for showing an example of a control channel included in a control region of a single subframe in a DL radio frame.

Referring to FIG. 5, a subframe consists of 14 OFDM symbols. According to a subframe configuration, the first 1 to 3 OFDM symbols are used for a control region and the other 13~11 OFDM symbols are used for a data region. In the diagram, R1 to R4 may indicate a reference signal (hereinafter abbreviated RS) or a pilot signal for antennas 0 to 3. The RS is fixed as a constant pattern in the subframe irrespective of the control region and the data region. The control channel is assigned to a resource to which the RS is not assigned thereto among the control region and a traffic channel is also assigned to a resource to which the RS is not assigned thereto among the data region. The control channel assigned to the control region may include a physical control format indicator channel (PCFICH), a physical hybrid-ARQ indicator channel (PHICH), a physical downlink control channel (PDCCH) and the like.

The physical control format indicator channel (PCFICH) informs a user equipment of the number of OFDM symbols used for the PDCCH in every subframe. The PCFICH is situated at the first OFDM symbol and is configured prior to the PHICH and the PDCCH. The PCFICH consists of 4 resource element groups (REG) and each of the REGs is distributed in the control region based on a cell ID (cell identity). One REG consists of 4 resource elements (RE). The RE may indicate a minimum physical resource defined as 'one subcarrier×one OFDM symbol'. The value of the PCFICH may indicate the value of 1 to 3 or 2 to 4 according to a bandwidth and is modulated by a QPSK (quadrature phase shift keying).

The physical hybrid-ARQ indicator channel (PHICH) is used for carrying HARQ ACK/NACK for an UL transmission. In particular, the PHICH indicates a channel in which DL ACK/NACK information for UL HARQ is transmitted. The PHICH consists of a single REG and is scrambled cell-specifically. The ACK/NACK is indicated with 1 bit and is modulated by BPSK (binary phase shift keying). The modulated ACK/NACK is spread into a spread factor (SF) 2 or 4. A plurality of PHICHs, which are mapped to a same resource, composes a PHICH group. The number of PHICH, which is multiplexed by the PHICH group, is determined according to the number of spreading code. The PHICH (group) is repeated three times to obtain diversity gain on a frequency domain and/or a time domain.

The physical downlink control channel (PDCCH) is assigned to the first n OFDM symbol of a subframe. In this case, the n is an integer more than 1 and indicated by the PCFICH. The PDCCH consists of at least one CCE. The PDCCH informs each of user equipments or a user equipment group of information on resource allocation of a PCH (paging channel) and a DL-SCH (downlink-shared channel), which correspond to transport channels, an uplink scheduling grant, HARQ information and the like. The PCH (paging channel) and the DL-SCH (downlink-shared channel) are transmitted on the PDSCH. Hence, an eNode B and a user equipment transmit and receive data on the PDSCH in general except a specific control information or a specific service data.

Information for indicating prescribed user equipment (one or a plurality of user equipments) configured to receive data of the PDSCH, information for indicating a method of receiving/decoding the PDSCH data, and the like are transmitted in a manner of being included in the PDCCH. For instance, assume that a specific PDCCH is CRC masked with an RNTI (radio network temporary identity) called "A" and information on data transmitted using a radio resource (e.g., frequency position) called "B" and a transmission form information (e.g., a transport block size, a modulation scheme, coding information, and the like) called "C" is transmitted in a specific subframe. In this case, the user equipment within a cell monitors the PDCCH using the RNTI information of the user equipment. If there exist at least one or more user equipments having the "A" RNTI, the user equipments receive the PDCCH. And, the user equipments receives the PDSCH, which is indicated by the "B" and the "C", via the received information of the PDCCH.

Figure 6:
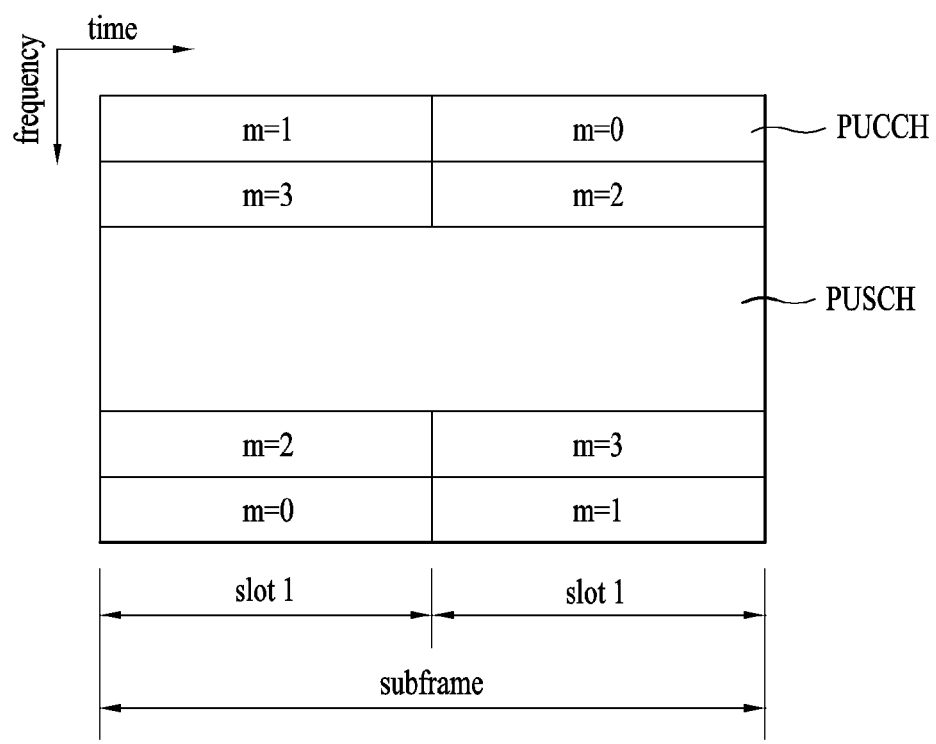
FIG. 6 is a diagram for a structure of an uplink subframe used in LTE system.

FIG. 6 is a diagram for a structure of an uplink subframe used in LTE system.

Figure 8:
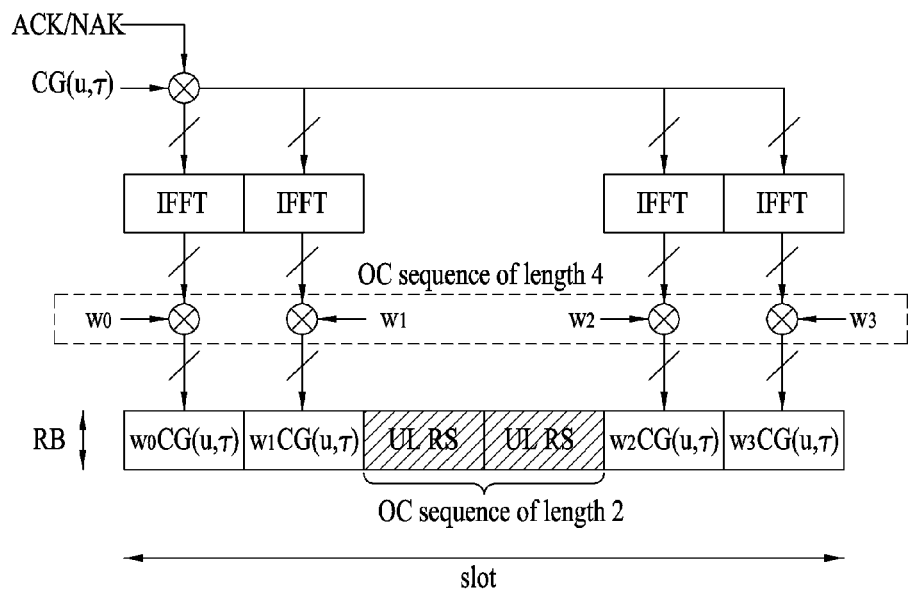

Referring to FIG. 6, an UL subframe can be divided into a region to which a physical uplink control channel (PUCCH) carrying control information is assigned and a region to which a physical uplink shared channel (PUSCH) carrying a user data is assigned. A middle part of the subframe is assigned to the PUSCH and both sides of a data region are assigned to the PUCCH in a frequency domain. The control information transmitted on the PUCCH includes an ACK/NACK used for HARQ, a CQI (channel quality indicator) indicating a DL channel status, an RI (rank indicator) for MIMO, an SR (scheduling request) corresponding to an UL resource allocation request, and the like. The PUCCH for a single UE uses one resource block, which occupies a frequency different from each other in each slot within a subframe. In particular, 2 resource blocks assigned to the PUCCH are frequency hopped on a slot boundary. In particular, FIG. 8 shows an example that the PUCCHs satisfying conditions (e.g., m=0, 1, 2, 3) are assigned to a subframe.

The PUCCH can be used to transmit following control information.

SR (scheduling request): information used to request UL-SCH resource. This information is transmitted using OOK (on-off keying) scheme.

HARQ ACK/NACK: a response signal transmitted in response to PDCCH and/or a DL data packet (e.g., codeword) on PDSCH. This information indicates whether a PDCCH or PDSCH is successfully received. HARQ-ACK 1 bit is transmitted in response to a single DL codeword. HARQ-ACK 2 bits are transmitted in response to two DL codewords. A HARQ-ACK response includes a positive ACK (simply, ACK), a negative ACK (hereinafter abbreviated NACK), DTX (discontinuous transmission), or NACK/DTX. In this case, such a terminology as HARQ-ACK can be used interchangeably with HARQ ACK/NACK or ACK/NACK.

CSI (channel state information): feedback information for a DL channel. MIMO (multiple input multiple output)-related feedback information includes an RI (rank indicator) and a PMI (precoding matrix indicator).

An amount of UL control information (UCI) capable of being transmitted by a user equipment in a subframe depends on the number of SC-FDMA available for transmitting control information. The SC-FDMA available for transmitting the control information indicates remaining SC-FDMA symbols except SC-FDMA symbol used for transmitting a reference signal in the subframe. In case of a subframe to which an SRS (sounding reference signal) is set, a last SC-FDMA symbol of the subframe is also excluded from the available SC-FDMA. A reference signal is used for coherent detection of PUCCH. PUCCH supports various formats according to transmitted information.

A format of PUCCH is briefly explained. A PUCCH format 1 is used for transmitting a scheduling request (SR), a PUCCH format 1a/1b is used for transmitting ACK/NACK information, a PUCCH format 2 is used for carrying channel state information (CSI) such as CQI, PMI, RI and the like, a PUCCH format 2a/2b is used for carrying ACK/NACK information together with CSI, and a PUCCH format 3 is mainly used for transmitting ACK/NACK information.

FIGS. 7 to 11 are diagrams for an example of transmitting uplink control information using a PUCCH (physical uplink control channel) format 1 affiliation, a PUCCH format 2 affiliation and a PUCCH format 3 affiliation.

In 3GPP LTE/LTE-A system, a subframe including a normal CP consists of 2 slots and each slot includes 7 OFDM symbols (or SC-FDMA symbols). A subframe including an extended CP consists of 2 slots and each slot includes 6 OFDM symbols (or SC-FDMA symbols). Since the number of OFDM symbols (or SC-FDMA symbols) included in a subframe varies according to a CP length, a structure of transmitting PUCCH in a UL subframe also varies according to the CP length. Hence, a method for a UE to transmit UCI in a UL subframe varies according to a PUCCH format and the CP length.

Figure 7:
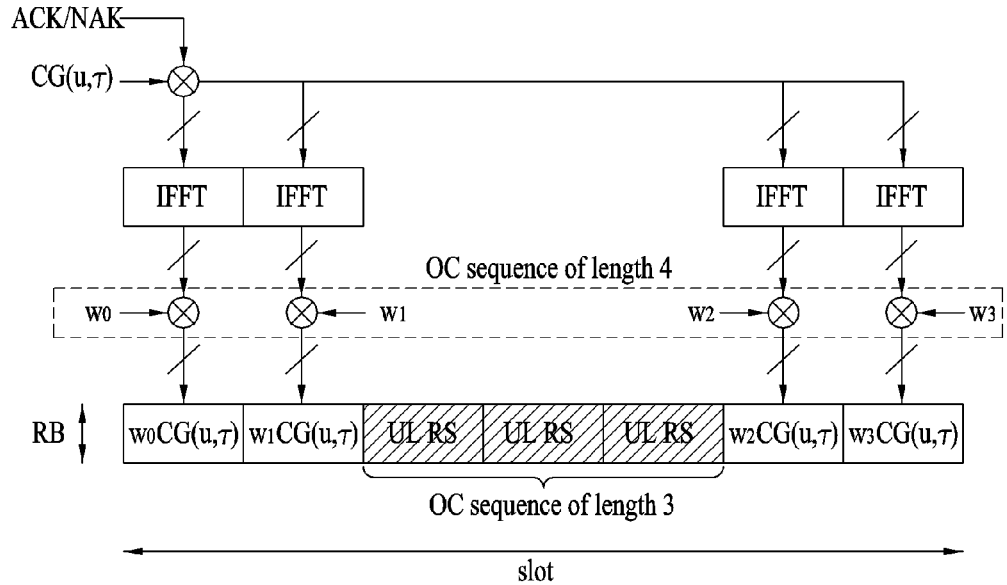
FIGS. 7 to 11 are diagrams for an example of transmitting uplink control information using a PUCCH (physical uplink control channel) format 1 affiliation, a PUCCH format 2 affiliation and a PUCCH format 3 affiliation.

Referring to FIG. 7 and FIG. 8, in case of transmitting control information using a PUCCH format 1a and 1b, control information of identical content is repeated in a subframe in slot unit. Each UE transmits an ACK/NACK signal via resources different from each other consisting of a different CS (cyclic shift) of a CG-CAZAC (computer-generated constant amplitude zero auto correlation) and an OCC (orthogonal cover code). The CS corresponds to a frequency domain code and the OCC may correspond to a time domain spreading code. The orthogonal cover code may be named an orthogonal sequence. For instance, the OCC includes a Walsh/DFT (discrete Fourier Transform) orthogonal code. If the number of the CS corresponds to 6 and the number of the OCC corresponds to 3, total 18 PUCCHs can be multiplexed in an identical PRB (physical resource block) on the basis of a single antenna port. Orthogonal sequences $w_0$, $w_1$, $w_2$ and $w_3$ can be applied in random time domain after FFT (Fast Fourier Transform) modulation is performed or in random frequency domain before the FFT modulation is performed.

In 3GPP LTE/LTE-A system, a PUCCH resource used for transmitting ACK/NACK is represented by a combination of a position of a time-frequency resource (e.g., PRB), cyclic shift of a sequence used for frequency spreading, and an orthogonal code (or quasi-orthogonal code) used for time spreading. Each PUCCH resource is indicated by a PUCCH resource index (also called a PUCCH index). A slot level structure of a PUCCH format 1 for transmitting an SR (scheduling request) is identical to a PUCCH format 1a and 1b. The PUCCH format 1 is different from the PUCCH format 1a/1b in a modulating scheme only.

Figure 9:
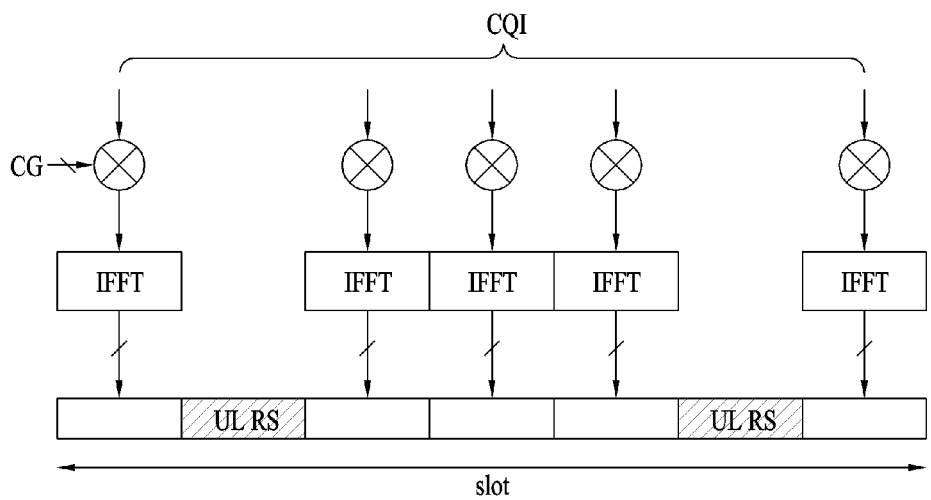
Figure 10:
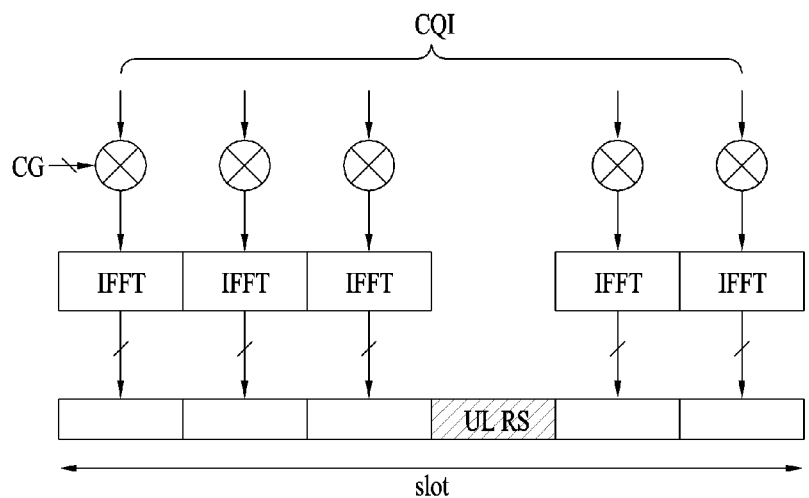

FIG. 9 shows an example of transmitting CSI (channel state information) in a UL slot including a normal CP using a PUCCH format 2/2a/2b and FIG. 10 shows an example of transmitting CSI in a UL slot including an extended CP using the PUCCH format 2/2a/2b.

Referring to FIG. 9 and FIG. 10, in case of a normal CP, a UL subframe includes 10 SC-FDMA symbols except a symbol carrying a UL reference signal (RS). Channel state information is coded into 10 transmission symbols (also called complex-valued modulation symbol) via block coding. The 10 transmission symbols are transmitted to an eNB in a manner of being respectively mapped to the 10 SC-FDMA symbols.

The PUCCH format 1/1a/1b and the PUCCH format 2/2a/2b can carry UCI (uplink control information) within a prescribed number of bits only. Yet, as a carrier aggregation technique is applied, the number of antennas increases, and a TDD system, a relay system and a multi node system are introduced, an amount of UCI to be transmitted is increasing. As a result, a PUCCH format capable of carrying UCI greater than the amount of UCI capable of being transmitted by the PUCCH format 1/1a/1b/2/2a/2b is introduced. The PUCCH format corresponds to a PUCCH format 3. For instance, in case that a UE to which carrier aggregation is set transmits a plurality of ACKs/NACKs in response to a plurality of PDSCHs received from an eNB via a plurality of DL carriers, the UE can use the PUCCH format 3 in case of transmitting a plurality of the adjacent ACKs/NACKs via a specific UL carrier.

Figure 11:
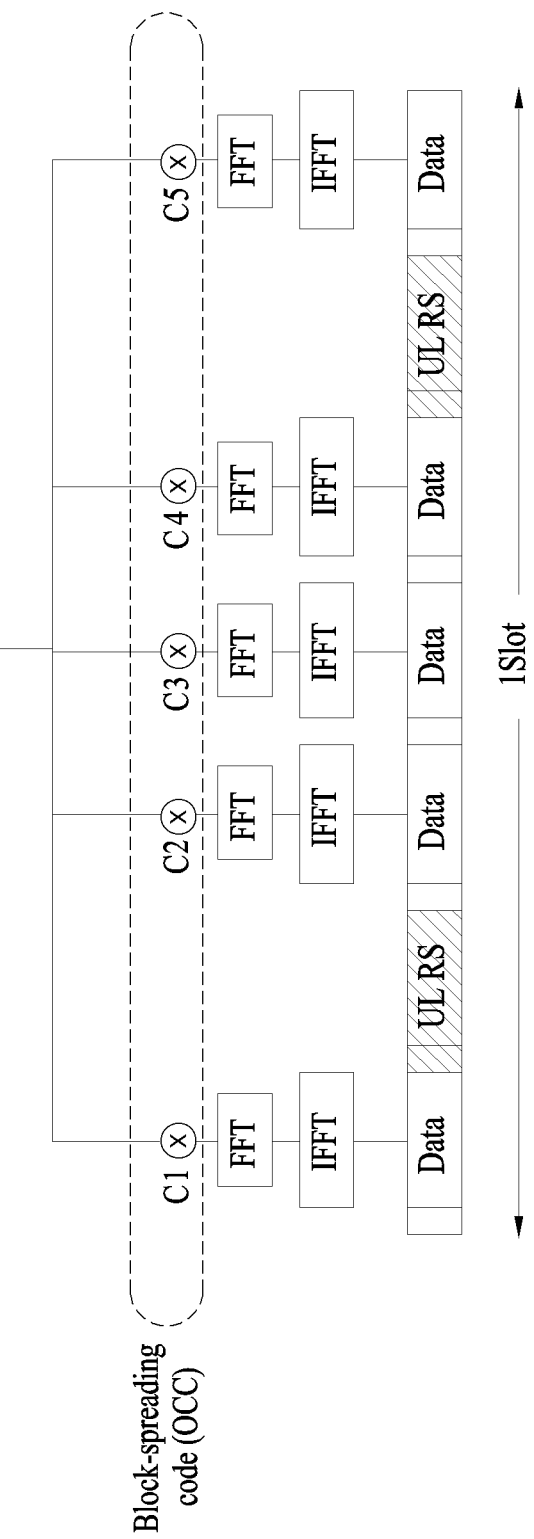

For instance, the PUCCH format 3 can be configured based on block-spreading. Referring to FIG. 11, a block-spreading scheme transmits a symbol sequence in a manner of spreading the sequence in time domain using an OCC (or orthogonal sequence). According to the block-spreading scheme, control signals of many UEs can be transmitted to an eNB in a manner of being multiplexed to an identical RB by the OCC.

In case of the PUCCH format 2, one symbol sequence is transmitted in a manner of being passing through time domain and UCIs of UEs are transmitted to an eNB in a manner of being multiplexed using a cyclic shift (CCS) of CAZAC sequence. On the contrary, in case of a new PUCCH format (e.g., PUCCH format 3) based on block-spreading, one symbol sequence is transmitted in a manner of being passing through frequency domain and UCIs of UEs are transmitted to an eNB in a manner of being multiplexed using OCC-based time domain spreading.

For instance, referring to FIG. 8, one symbol sequence is spread by an OCC of length 5 (i.e., SF=5) and is mapped to 5 SC-FDMA symbols. Although FIG. 10 shows a case of using 2 RS symbols during a slot, it may use 3 RS symbols and an OCC of length 4 (SF=4) can be used for spreading a symbol sequence and UE multiplexing. In this case, an RS symbol can be generated by a CAZAC sequence of a specific cyclic shift and a UE can transmit an RS symbol to an eNB in a manner of applying/multiplying a specific OCC to a plurality of RS symbols in time domain. In FIG. 11, DFT can be preferentially applied prior to an OCC. FFT (Fast Fourier Transform) can be applied instead of the DFT.

In FIG. 7 to FIG. 11, an UL RS (uplink reference signal) transmitted on PUCCH together with UCI can be used for demodulating the UCI in an eNB.

Figure 12:
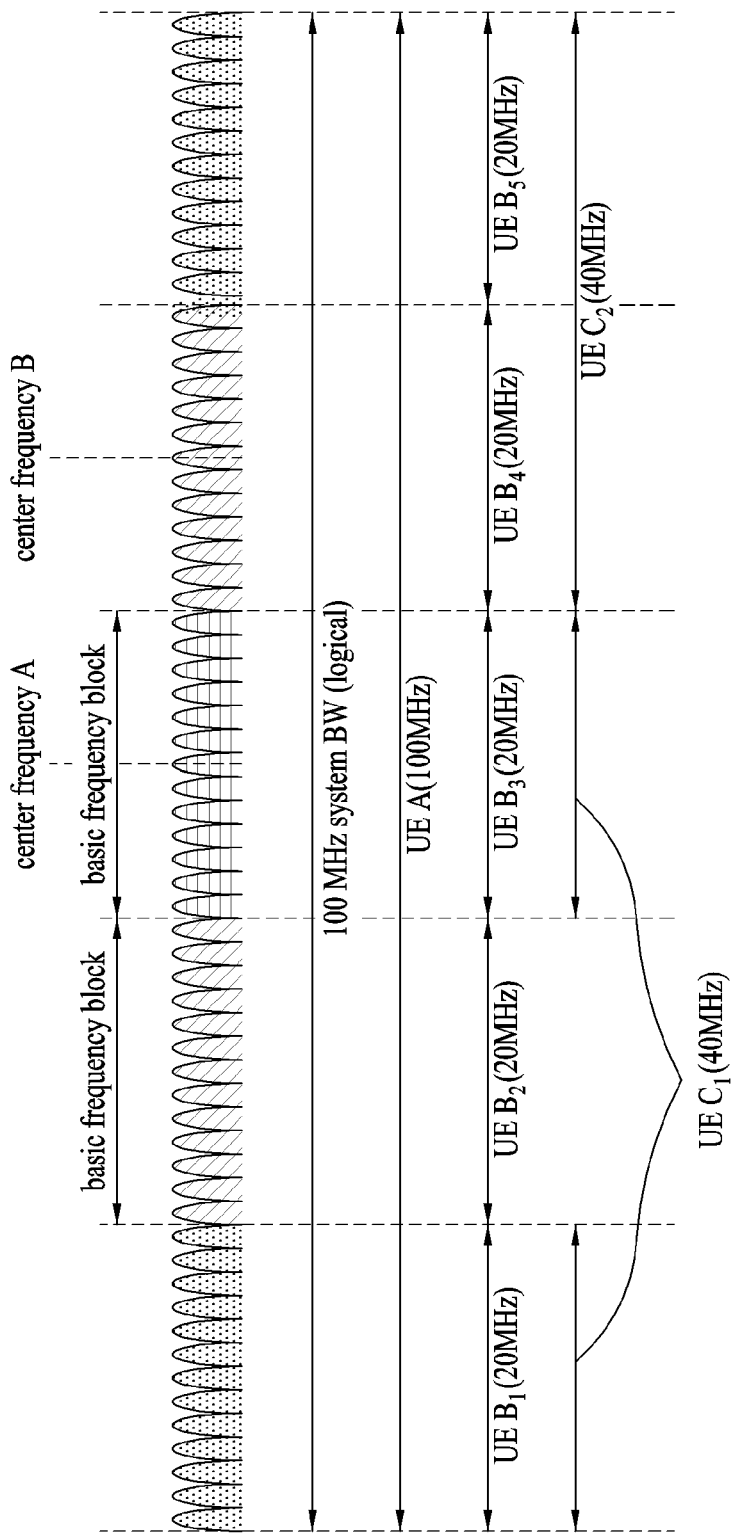
FIG. 12 is a conceptual diagram for explaining a carrier aggregation scheme.

In the following description, a carrier aggregation scheme is explained. FIG. 12 is a conceptual diagram for explaining a carrier aggregation scheme.

A carrier aggregation means a technology using one big logical frequency band in a manner that a user equipment uses a frequency block configured with an uplink resource (or a component carrier) and/or a downlink resource (or a component carrier) or a plurality of cells (of logical meaning) in order for a wireless communication system to use a wider frequency band. For clarity, a terminology of 'component carrier' is consistently used in the following description.

Referring to FIG. 12, a total system bandwidth (system BW) may have a system bandwidth up to maximum 100 MHz as a logical bandwidth. The total system bandwidth includes five component carriers and each of the component carriers may have up to maximum 20 MHz. The component carrier includes at least one physically contiguous subcarrier. Although each of the component carriers in FIG. 12 is depicted as including an identical bandwidth, this is exemplary only. Each of the component carriers may be able to have a bandwidth different from each other. And, although each of the component carriers is depicted as it is adjacent to each other in frequency domain, since the diagram is depicted in terms of a logical concept, each of the component carriers may be physically adjacent to each other or may be apart from each other.

A center frequency can be differently used for each of the component carriers or a common center frequency can be used for the component carriers physically adjacent to each other. As an example, in FIG. 12, if assumed that all component carriers are physically adjacent to each other, a center frequency 'A' can be used. Or, if assumed that each of the component carriers is not physically adjacent to each other, such a separate center frequency as a center frequency 'A', a center frequency 'B' or the like can be used for each of the component carriers.

In the present specification, a component carrier may correspond to a system bandwidth of a legacy system. By defining the component carrier on the basis of the legacy system, it may become easy to provide backward compatibility and to design a system in a radio communication environment in which an evolved UE and a legacy UE coexist. As an example, in case that LTE-A system supports a carrier aggregation, each of the component carriers may correspond to a system bandwidth of LTE system. In this case, the component carrier may have a prescribed bandwidth among the bandwidths of 1.25 MHz, 2.5 MHz, 5 MHz, 10 MHz, or 20 MHz.

In case that a total system bandwidth is expanded by a carrier aggregation, a frequency band used for communicating with each UE is defined by a component carrier unit. A UE A may use 100 MHz corresponding to the total system bandwidth and performs a communication in a manner of using all of the five component carriers. A UE $B_1 \sim B_5$ can use a bandwidth of 20 MHz only and performs a communication by using one component carrier. A UE $C_1$ and a UE $C_2$ can use a bandwidth of 40 MHz and performs a communication by using two component carriers, respectively. The two component carriers may or may not be logically/physically adjacent to each other. The UE $C_1$ indicates a case that the UE $C_1$ uses two component carriers not adjacent to each other and the UE $C_2$ indicates a case that the UE $C_2$ uses two component carriers adjacent to each other.

LTE system uses one DL component carrier and one UL component carrier. On the other hand, LTE-A system may use a plurality of component carriers as depicted in FIG. 12. A DL component carrier or a combination of the DL component carrier and a UL component carrier corresponding to the DL component carrier can be called a cell. A corresponding relation between the DL component carrier and the UL component carrier can be indicated by system information.

In this case, a scheme of scheduling a data channel, which is scheduled by a control channel, can be divided into a conventional linked carrier scheduling scheme and a cross carrier scheduling scheme.

More specifically, in case of the linked carrier scheduling scheme, similar to a legacy LTE system using a single component carrier, a control channel transmitted on a specific component carrier schedules a data channel only via the specific component carrier. In particular, a DL grant/UL grant, which is transmitted to a PDCCH region of a DL component carrier of a specific component carrier (or a specific cell), can schedule PDSCH/PUSCH of a cell to which the DL component carrier belongs thereto only. In particular, a search space corresponding to a space in which detection of the DL grant/UL grant is attempted exists at a PDCCH region of a cell at which PDSCH/PUSCH (i.e., a target of scheduling) is located.

Meanwhile, in case of the cross carrier scheduling scheme, a control channel transmitted on a primary component carrier (primary CC) schedules a data channel transmitted on the primary component carrier or a different component carrier using a carrier indicator field (hereinafter abbreviated CIF). In other word, a monitored cell (or a monitored CC) of the cross carrier scheduling is configured and a DL grant/UL grant transmitted in a PDCCH region of the monitored cell schedules PDSCH/PUSCH of a cell configured to be scheduled in the corresponding cell. In particular, a search space for a plurality of component carriers exists at a PDCCH region of the monitored cell. The PCell among a plurality of the cells is configured to transmit system information, attempt an initial access and transmit UL control information. The PCell consists of a DL primary component carrier and an UL primary component carrier corresponding to the DL primary component carrier.

Figure 13:
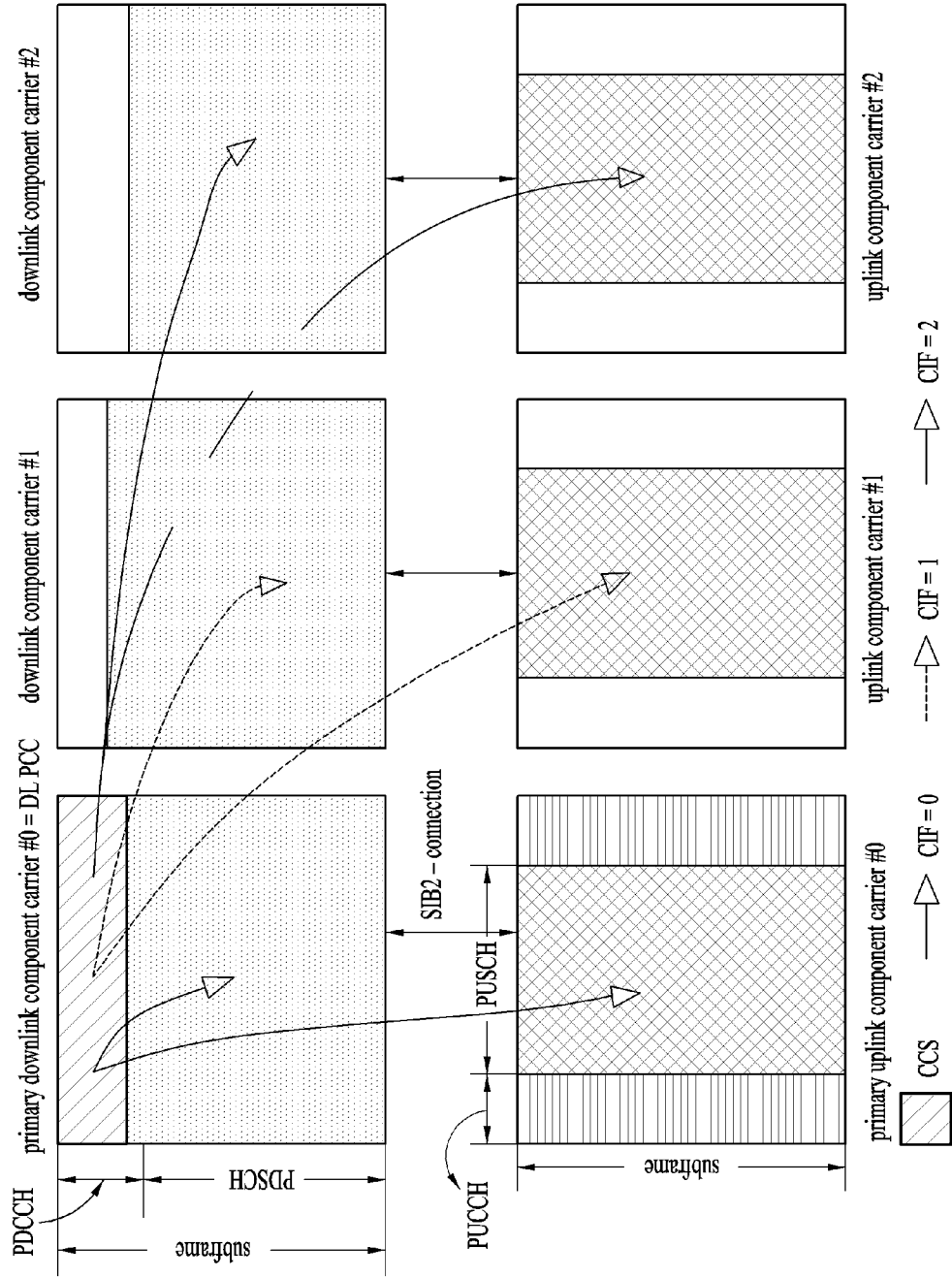
FIG. 13 is a diagram of an example to which a cross carrier scheduling scheme is applicable.

FIG. 13 is a diagram of an example to which a cross carrier scheduling scheme is applicable. In particular, the number of cell (or, a component carrier) assigned to a relay node corresponds to 3 in FIG. 13. As mentioned in the foregoing description, the cross carrier scheduling is performed using a CIF. In this case, assume that a DL cell (or, a component carrier) #A is a primary DL component carrier (i.e., a primary cell (PCell)) and assume that a component carrier #B and a component carrier #C are a secondary component carriers (i.e., secondary cell (SCell)).

The present invention proposes a method for a UE to transmit a HARQ-ACK signal via an UL resource in response to data received in DL while the UE is performing carrier aggregation operation. In the following, although a case that the UE operates by aggregating two component carriers is explained, it is apparent that the present invention can also be applied to a case that the UE aggregates three or more component carriers with each other.

Figure 14:
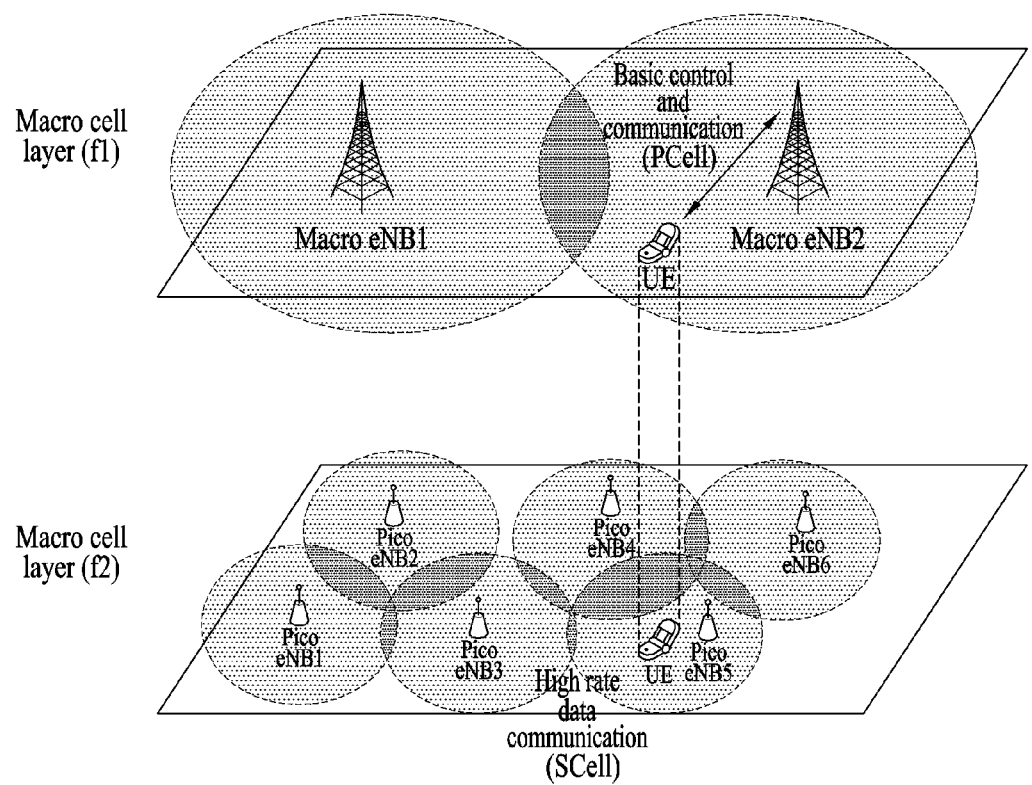
FIG. 14 is a configuration diagram for a network consisted of two component carriers.

FIG. 14 is a configuration diagram for a network consisted of two component carriers.

Referring to FIG. 14, first of all, it is able to know that a macro cell layer, which has a small number of macro cells including coverage of wide area, is configured using a single carrier frequency $f_1$. The carrier frequency $f_1$ is positioned at a relatively low frequency band where propagation loss is low, provides a basic communication service to a UE over a wider area, and performs such an operation as mobility management and the like. Hence, it is preferable to configure the corresponding frequency as PCell.

Secondly, it is able to know that a micro cell layer, which has a plurality of micro cells including coverage of narrower area, is configured using an additional single carrier frequency $f_2$. The carrier frequency $f_2$ is positioned at a relatively high frequency band to easily occupy a wide bandwidth although propagation loss is high. The carrier frequency $f_2$ provides a communication service of high quality to a UE for a specific area. Hence, it is preferable to configure the corresponding frequency as SCell.

In such a situation as shown in FIG. 14, it is relatively easy to configure a UE to perform communication with an eNB in all of a plurality of cell layers in DL communication. This is because it is simple to implement a plurality of receivers and power consumed for managing a plurality of the receivers is not that big. On the contrary, it may be difficult for a UE to perform communication with an eNB in all of a plurality of the cell layers in UL communication. This is because, if a plurality of transmitters operating on frequency bands different from each other operate at the same time, an interference problem between a plurality of the transmitters should be solved and transmit power consumed by a plurality of the transmitters is increasing.

Hence, as a method of obtaining high data transmission rate, in particular high data transmission rate in DL while reducing implementation cost of a UE, it may be able to implement the UE to receive DL signals in a plurality of cell layers at the same time and enable the UE to transmit a UL signal in a part of a plurality of the cell layers only at a certain timing point.

In the following description, if the number of cell layers capable of being transmitted and received by a UE is different from each other in DL and UL, the present invention proposes a method of appropriately managing a UL resource. For clarity, assume that a UE can receive a signal in two cell layers ($f_{1,D}$ and $f_{2,D}$) (or two frequency bands) at the same time in DL while the UE performs transmission in one of two cell layers ($f_{1,U}$, $f_{2,U}$) only in UL. In a TDD system distinguishing DL from UL according to time in an identical frequency band, $f_{1,D}$ and $f_{1,U}$ are identically given.

Under this assumption, since a UE is able to perform communication in a single layer only via an UL resource, the UE should properly select a layer in which UL communication is to be performed at every moment.

As shown in FIG. 14, if it is assume that communication for a basic control signal is performed by configuring a macro cell layer as a PCell and communication for high capacity data is performed by configuring a micro cell layer as an SCell, when a UE initially attempts to access a network, since most of related DL signals is transmitted from the PCell, it is preferable to set UL to the macro cell layer. Thereafter, if the network identifies surrounding information of the UE and finds out an appropriate micro eNB based on the surrounding information, since most of DL signals is transmitted from the SCell, it is preferable to perform an UL operation in the micro cell layer where a resource reuse is easy and communication is available with low transmit power. Meanwhile, if the UE moves around and is located at a point at which no adjacent micro eNB exists, it is preferable to set an UL operation to the macro cell layer for minimum communication.

In general, in terms of DL, a macro cell layer covering a wider area is configured as PCell to transmit a basic control signal and a DL signal when SCell connection is unstable. On the contrary, it is preferable to utilize a micro cell layer by configuring the micro cell layer as SCell to enhance data transmission rate.

Yet, in terms of UL, if a cell layer for UL transmission changes according to a situation, it is necessary to appropriately design an UL HARQ-ACK transmission scheme for a DL signal, which is a sort of UL signal.

In a situation to which a carrier aggregation scheme is applied, a UE should transmit a plurality of ACK/NACK signals via a single UL HARQ-ACK signal at a specific timing point in response to PDSCH received from many subframes and many cells. To this end, it is necessary to perform an operation of multiplexing a plurality of the ACK/NACK signals with the single UL HARQ-ACK signal. For instance, there is a method of transmitting a plurality of the ACK/NACK signals in a manner of coding a plurality of the ACK/NACK signals together in an UL HARQ-ACK container, which uses relatively large number of resources, such as the aforementioned PUCCH format 3.

Although the aforementioned method is used, if a single PDSCH is received only, since it is required to transmit information on a single ACK/NACK (or if two codewords are received via MIMO transmission, two ACKs/NACKs) only, it is more profitable to use a PUCCH format 1a/1b instead of the container using many resources such as the PUCCH format 3 and the like.

To this end, according to a current carrier aggregation operation, if a single PDSCH is received via PCell, the operation uses a PUCCH format 1a/1b interlocked with the PDSCH instead of the PUCCH format 3. This operation can be named a fallback operation to the PUCCH format 1a/1b.

Currently, the fallback operation to the PUCCH format 1a/1b is appropriate when a UE transmits UL HARQ-ACK using a macro cell layer. Yet, if the UE is configured to transmit the UL HARQ-ACK using a micro cell layer, it is necessary to have a fallback operation of a different form. When the UE follows a legacy fallback operation, if the UE receives a single PDSCH via SCell in a situation that the UE is stably connected with a pico eNB corresponding to the SCell, it is necessary to use the PUCCH format 3 consuming great amount of resources, since it is not a case that the UE receives a single PDSCH via PCell.

In order to supplement the aforementioned problem, the present invention proposes to adjust a cell layer (or frequency layer) in which a fallback operation is performed according to a situation. For instance, if an additional fallback operation is defined in addition to a legacy fallback operation and a sole PDSCH is transmitted in SCell according to the additional fallback operation, UL HARQ-ACK is transmitted using a cell layer linked to the SCell using the PUCCH format 1a/1b in a PUCCH resource, which is connected with a message scheduling the PDSCH.

A network can inform a UE of one fallback operation to be used among the two fallback operations via such an upper layer signal as an RRC according to a situation. Or, a fallback operation to be performed can be automatically designated according to a cell layer to which an UL signal is transmitted. Specifically, if a UE is indicated to perform an UL operation in a micro cell layer interlocked with SCell, the aforementioned additional fallback operation can be automatically performed. In particular, if a sole PDSCH is transmitted in the SCell, an operation of using the PUCCH format 1a/1b can be automatically performed. As an example of indicating the UE to perform UL transmission in the micro cell layer interlocked with the SCell, an eNB may indicate a subframe in which the UL transmission is to be performed in the micro cell layer interlocked with the SCell in advance via an upper layer and may regulate the aforementioned additional fallback operation to be performed in the indicated subframe.

Figure 15:
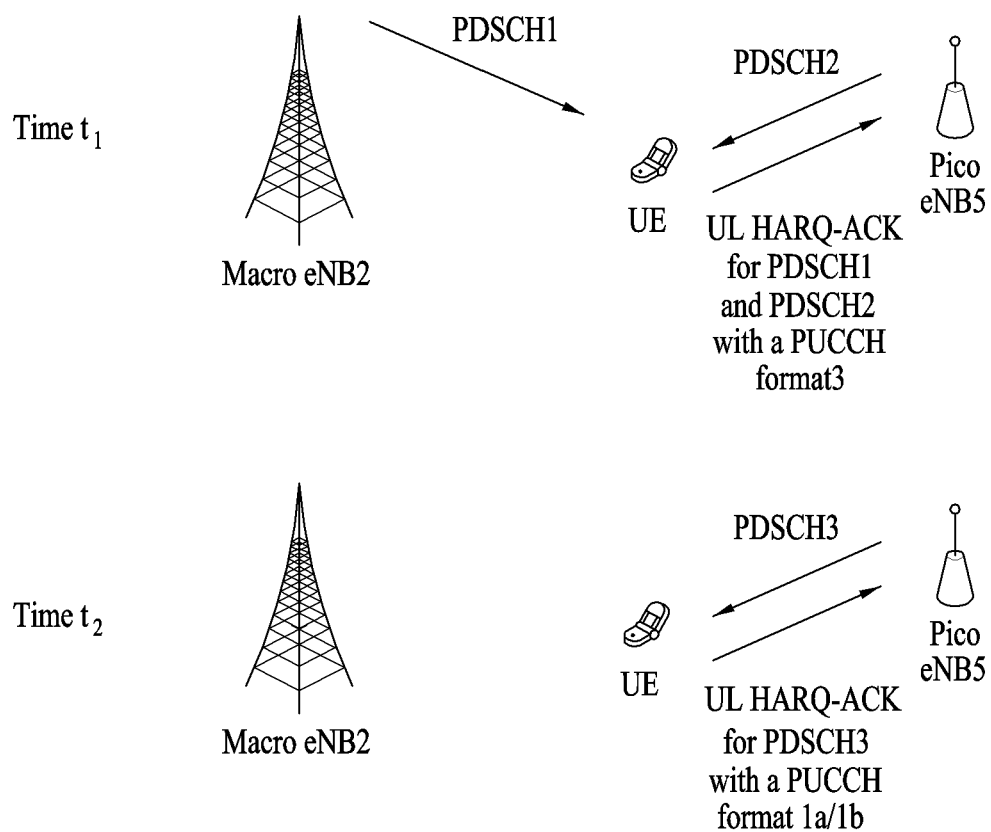
FIG. 15 is a diagram for an example of transmitting an uplink HARQ-ACK, which is transmitted by a UE, according to embodiment of the present invention.

FIG. 15 is a diagram for an example of transmitting an uplink HARQ-ACK, which is transmitted by a UE, according to embodiment of the present invention. In particular, similar to FIG. 14, FIG. 15 shows an operation in a situation that a macro eNB2 is configured as a PCell and a pico eNB5 is configured as a SCell.

Referring to FIG. 15, since both the PCell and the SCell transmit PDSCH at a timing point t1, it is able to know that a plurality of ACKs/NACKs are generated in response to the PDSCHs and UL HARQ-ACK is transmitted to the pico eNB5 using a PUCCH format 3. On the contrary, since a sole PDSCH is transmitted from the SCell at a timing point t2, it is able to know that a single ACK/NACK is generated and UL HARQ-ACK is transmitted to the pico eNB5 using a PUCCH format 1a/1b.

In case of applying a new fallback operation mentioned earlier in FIG. 15, an operation of indicating an UL HARQ-ACK resource can also be adjusted. For instance, since a PUCCH resource, which is used for a fallback operation, i.e., a resource used for transmitting UL HARQ-ACK, is determined based on a resource interlocked with a first PDSCH received in the SCell in general, a message scheduling the PDSCH does not need an indicator indicating the UL HARQ-ACK resource. Hence, the indicator indicating the UL HARQ-ACK resource can be eliminated from the message scheduling the first PDSCH, which is received in the SCell.

In case of using the PUCCH format 3 in a current carrier aggregation technique, a resource index of the PUCCH format 3, which is used for transmitting the UL HARQ-ACK, is indicated using a power control command field existing in a scheduling message of PDSCH. In this case, if an additional fallback mode according to the present invention is applied, a power control command field of a message scheduling the first PDSCH received in the SCell can be used for a usage of an original power control command instead of a usage of indicating the resource index of the PUCCH format 3.

Meanwhile, a power control command field of a message scheduling first PDSCH received in the PCell, which is defined in a legacy PDCCH format 3 operation, can also be differently interpreted. For instance, if UL HARQ-ACK is configured to be transmitted using a PUCCH resource interlocked with a first PDSCH scheduling message of the SCell or if the UL HARQ-ACK is configured to be transmitted using a cell layer interlocked with the SCell, the power control command field of the message scheduling first PDSCH received in the PCell can also be used as an indicator indicating the resource index of the PUCCH format 3 to transmit the UL HARQ-ACK.

Specifically, a power control command field of a message scheduling PDSCH 1, which is transmitted by the PCell at the timing of t1, is used for a usage of designating a resource index of the PUCCH format 3. On the contrary, a power control command field of a message scheduling PDSCH 2, which is transmitted by the SCell, is used for a usage of designating power control of corresponding PUCCH.

The aforementioned series of operations can be implemented in a form of redefining the PCell and the SCell in terms of UL HARQ-ACK transmission. In particular, in terms of reception/detection/measurement of a DL signal such as radio link monitoring and common search space monitoring, a structure of a legacy PCell and SCell is maintained as it is. In particular, the radio link monitoring and the common search space monitoring are performed in the PCell only. Yet, in terms of transmission of UL HARQ-ACK, a cell configured as the SCell is considered as the PCell. In terms of a DL signal, a cell configured as the PCell is considered as the SCell.

More specifically, referring to FIG. 14, although a macro eNB2 corresponds to the PCell and a pico eNB5 corresponds to the SCell in case of receiving a DL signal, the pico eNB5 corresponds to the PCell and the macro eNB2 corresponds to the SCell in case of transmitting UL HARQ-ACK.

In case of applying the present invention, although a UE transmits UL HARQ-ACK using a cell layer interlocked with the SCell in DL, it may be necessary for the UE to transmit the UL HARQ-ACK using a cell layer interlocked with the PCell in some cases. For instance, in FIG. 14, if a UE suddenly moves around and a position of the UE is not clear in a micro cell layer, it may be preferable to transmit the UL HARQ-ACK using the macro cell layer again.

As a method of enabling the aforementioned operation to be performed, if a UE receives PDSCH via the PCell only, or if the UE receives a sole PDSCH via the PCell, a scheduling message used for receiving the PDSCH can be considered as an indication indicating UL HARQ-ACK to be transmitted via a cell layer interlocked with the PCell and the UE is able to transmit the UL HARQ-ACK according to the scheduling message. For instance, if a UE receives a sole PDSCH via the PCell, the UE transmits UL HARQ-ACK with a cell layer interlocked with the PCell using the PUCCH format 1a/1b, which is interlocked with a message scheduling the PDSCH.

In this case, a cell layer in which the UL HARQ-ACK is transmitted may vary according to a cell layer in which a message scheduling PDSCH is received by the UE. And, a target reception point of each layer also varies according to the cell layer in which the message scheduling the PDSCH is received. Hence, it may be necessary to modify a path loss criterion of open loop power control for the UL HARQ-ACK.

More specifically, in FIG. 14, if the UL HARQ-ACK is transmitted to the pico eNB5 of the micro cell layer, power control is performed in consideration of path loss with the pico eNB5. On the contrary, if the UL HARQ-ACK is transmitted to the macro eNB2 of the macro cell layer, power control is performed in consideration of path loss with the macro eNB2. In this case, a power control command, which is used to be adjusted in accordance with transmission to the pico eNB5, does not correspond to transmission to the macro eNB2 in general. This is because the power control command indicating increase or decrease of transmit power is applied in a manner of being accumulated on the basis of previous transmit power. Hence, if an object of receiving the UL HARQ-ACK is modified according to the present invention, it is preferable to set transmit power after previous transmit power is reset.

Figure 16:
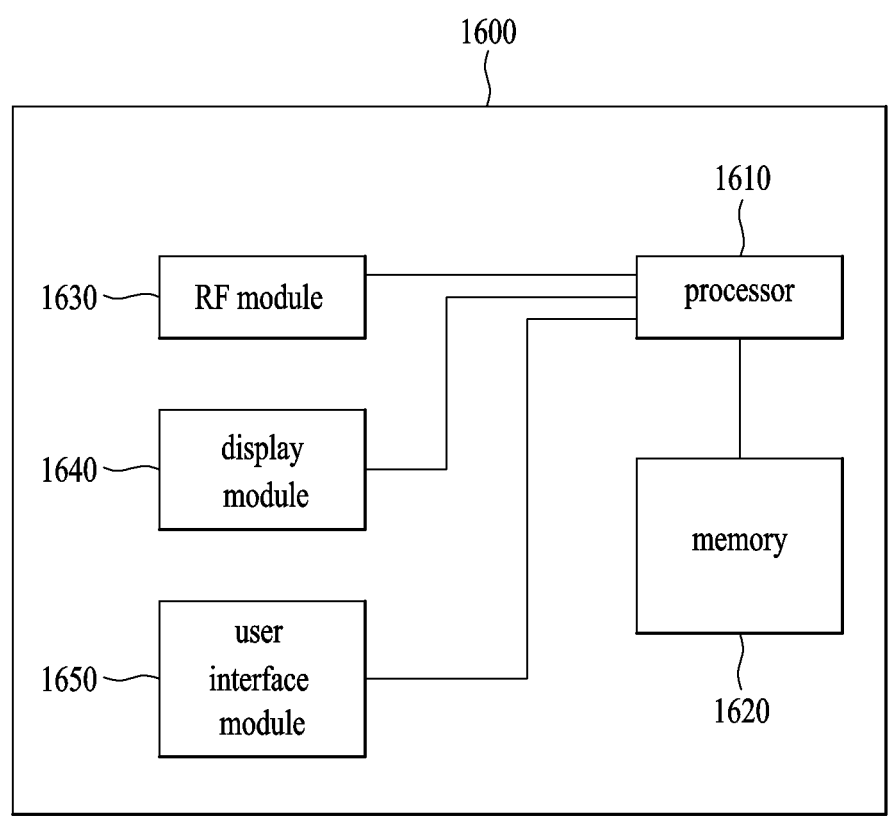
FIG. 16 is a block diagram of an example for a communication device according to one embodiment of the present invention.

FIG. 16 is a block diagram of an example for a communication device according to one embodiment of the present invention.

Referring to FIG. 16, a communication device 1600 may include a processor 1610, a memory 1620, an RF module 1630, a display module 1640, and a user interface module 1650.

Since the communication device 1600 is depicted for clarity of description, prescribed module(s) may be omitted in part. The communication device 1600 may further include necessary module(s). And, a prescribed module of the communication device 1600 may be divided into subdivided modules. A processor 1610 is configured to perform an operation according to the embodiments of the present invention illustrated with reference to drawings. In particular, the detailed operation of the processor 1610 may refer to the former contents described with reference to FIG. 1 to FIG. 15.

The memory 1620 is connected with the processor 1610 and stores an operating system, applications, program codes, data, and the like. The RF module 1630 is connected with the processor 1610 and then performs a function of converting a baseband signal to a radio signal or a function of converting a radio signal to a baseband signal. To this end, the RF module 1630 performs an analog conversion, amplification, a filtering, and a frequency up conversion, or performs processes inverse to the former processes. The display module 1640 is connected with the processor 1610 and displays various kinds of informations. And, the display module 1640 can be implemented using such a well-known component as an LCD (liquid crystal display), an LED (light emitting diode), an OLED (organic light emitting diode) display and the like, by which the present invention may be non-limited. The user interface module 1650 is connected with the processor 1610 and can be configured in a manner of being combined with such a well-known user interface as a keypad, a touchscreen and the like.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

In this disclosure, a specific operation explained as performed by an eNode B may be performed by an upper node of the eNode B in some cases. In particular, in a network constructed with a plurality of network nodes including an eNode B, it is apparent that various operations performed for communication with a user equipment can be performed by an eNode B or other networks except the eNode B. 'eNode B (eNB)' may be substituted with such a terminology as a fixed station, a Node B, an eNode B (eNB), an access point (AP) and the like.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Although a method of transmitting UL ACK/NACK signal, which is transmitted by a user equipment in a wireless communication system to which the carrier aggregation technique is applied, and an apparatus therefor are described with reference to examples applied to 3GPP LTE system, it may be applicable to various kinds of wireless communication systems as well as the 3GPP LTE system.

What is claimed is:

1. A method of transmitting an uplink (UL) ACK (acknowledgement)/NACK (negative ACK) signal, which is transmitted by a user equipment (UE) in a wireless communication system, the method comprising:
   receiving scheduling information from a network on a primary downlink (DL) cell;
   receiving one or more DL data signals based on the scheduling information from the network on at least one of the primary DL cell and a secondary DL cell; and
   transmitting an ACK/NACK signal corresponding to the one or more downlink data signals to the network,
   wherein if two or more downlink data signals are received, Physical Uplink Control Channel (PUCCH) format 3 is used for transmitting the ACK/NACK signal,
   wherein if only one downlink data signal is received, a specific PUCCH format for transmitting the ACK/NACK signal is determined according to whether the one downlink data signal is received on the primary DL cell or the secondary DL cell,
   wherein the specific PUCCH format is PUCCH format 3 when the one downlink data signal is received on the primary DL cell and the ACK/NACK signal is to be transmitted on a secondary UL cell, and
   wherein the specific PUCCH format is PUCCH format 1a or 1b when the one downlink data signal is received on the secondary DL cell and the ACK/NACK signal is to be transmitted on a secondary UL cell.

2. The method of claim 1, wherein a resource used for transmitting the ACK/NACK signal is determined based on a resource for receiving scheduling information on the one or more downlink data signals.

3. The method of claim 1, wherein the primary DL cell corresponds to a frequency band of a macro eNB and wherein the secondary DL cell corresponds to a frequency band of a micro eNB located within coverage of the macro eNB.

4. The method of claim 1, wherein when the one downlink data signal is received on the secondary DL cell, scheduling information of the one downlink data signal comprises information on a transmit power control command of the ACK/NACK signal.

5. The method of claim 1, wherein the specific PUCCH format is PUCCH format 1a or 1b when the one downlink data signal is received on the primary DL cell and the ACK/NACK signal is to be transmitted on a primary UL cell, and
   wherein the specific PUCCH format is PUCCH format 3 when the one downlink data signal is received on the secondary DL cell and the ACK/NACK signal is to be transmitted on a primary UL cell.

6. A user equipment in a wireless communication system, comprising:
   a transmission module,
   a reception module, and
   a processor, operatively connected to the transmission module and the reception module, that:
   controls the reception module to receive scheduling information from a network on a primary downlink (DL) cell and to receive one or more DL data signals based on the scheduling information from the network on at least one of the primary DL cell and a secondary DL cell; and
   controls the transmission module to transmit an ACK/NACK signal corresponding to the one or more downlink data signals to the network,
   wherein if two or more downlink data signals are received, Physical Uplink Control Channel (PUCCH) format 3 is used for transmitting the ACK/NACK signal,
   wherein if only one downlink data signal is received, a specific PUCCH format for transmitting the ACK/NACK signal is determined according to whether the one downlink data signal is received on the primary DL cell or the secondary DL cell,
   wherein the specific PUCCH format is PUCCH format 3 when the one downlink data signal is received on the primary DL cell and the ACK/NACK signal is to be transmitted on a secondary UL cell, and
   wherein the specific PUCCH format is PUCCH format 1a or 1b when the one downlink data signal is received on the secondary DL cell and the ACK/NACK signal is to be transmitted on a secondary UL cell.

7. The user equipment of claim 6, wherein the processor determines a resource used for transmitting the ACK/NACK signal based on a resource for receiving scheduling information on the one or more downlink data signals.

8. The user equipment of claim 6, wherein the primary DL cell corresponds to a frequency band of a macro eNB and wherein the secondary DL cell corresponds to a frequency band of a micro eNB located within coverage of the macro eNB.

9. The user equipment of claim 6, wherein when the one downlink data signal is received on the secondary DL cell, scheduling information of the one downlink data signal comprises information on a transmit power control command of the ACK/NACK signal.

10. The user equipment of claim 6, wherein the specific PUCCH format is PUCCH format 1a or 1b when the one downlink data signal is received on the primary DL cell and the ACK/NACK signal is to be transmitted on a primary UL cell, and wherein the specific PUCCH format is PUCCH format 3 when the one downlink data signal is received on the secondary DL cell and the ACK/NACK signal is to be transmitted on a primary UL cell.

* * * * *